Inventors
RICHARD SELIGMAN
& STANLEY W. T. PAINE
By Young, Emery & Thompson
Attorneys Patented June 5, 1951

2,555,938

UNITED STATES PATENT OFFICE 2,555,938

PREPARATION OF BREWERS' WORTS

Richard Seligman and Stanley William Thomas Paine, London, England, assignors to The A. P. V. Company Limited, London, England, a British company Application October 15, 1948, Serial No. 54,784
In Great Britain October 28, 1947

6 Claims. (Cl. 99—52)

This invention relates to the preparation of brewers' worts and its main object is to enable the heating of the wort to be effected economically.

The wort is generally boiled in a copper or heating vessel and subjected at some period to a high temperature and violent agitation to facilitate flocculation and stability of the beers.

According to the method described in the specification of British Patent No. 498,081, the wort is withdrawn from a copper or heating vessel, and is circulated through a closed circuit which includes a heater and a throttle whereby the pressure and the temperature of wort is increased so that after passing the throttle the wort re-enters the upper part of the copper at a temperature above that which corresponds to the static pressure prevailing in the copper and is therefore subjected to partial evaporation.

We have found that the wort requires to be heated to such a high temperature that on re-entering the copper the wort carries far more heat than is necessary to effect the degree of self evaporation that is required. Also if desired the heating of the wort may be effected during its passage from the usual mash tun to the copper.

According to the present invention the wort is passed through an indirect heat-exchange regenerator, then through an indirect heat-exchange heating apparatus in which the temperature of the wort is increased to the required maximum, and is then passed through the said regenerator so as to give up some of its heat to the low temperature wort passing therethrough.

Consequently the quantity of fuel required to supply heat to the heater is much less than formerly.

An apparatus for carrying out this method will comprise an indirect heat-exchange regenerator, an indirect heat-exchange heating apparatus connected to the low temperature side of the regenerator so that wort heated in the regenerator is further heated in the heating apparatus, a connection from the heating apparatus to the high temperature side of the regenerator so that heated wort passes through the regenerator and gives up some of its heat to the incoming wort, and a connection from the outlet of the high temperature side of the regenerator to a copper.

If desired, the wort after passing through the high temperature side of the regenerator may be introduced into the lower part of the copper or at least below the surface of the wort in the copper so as to effect the required violent agitation without necessitating vigorous boiling. The wort on re-entering the copper undergoes some degree of self-evaporation and by causing this to occur below the surface of the wort in the copper an effective agitation is achieved in a simple and convenient manner.

The invention will now be described by way of example with reference to the accompanying diagrammatic drawings wherein.

In all the diagrams 1 indicates a copper, 2 a pump, 3 an indirect heat-exchanger of the plate type having a regenerator section 4 and a heating section 5, the latter being connected to a device 10 which supplies a heating fluid. 12 is the low temperature side of the regenerator and 13 is the high temperature side of the regenerator. 6 is a holding tank.

Figure 1:
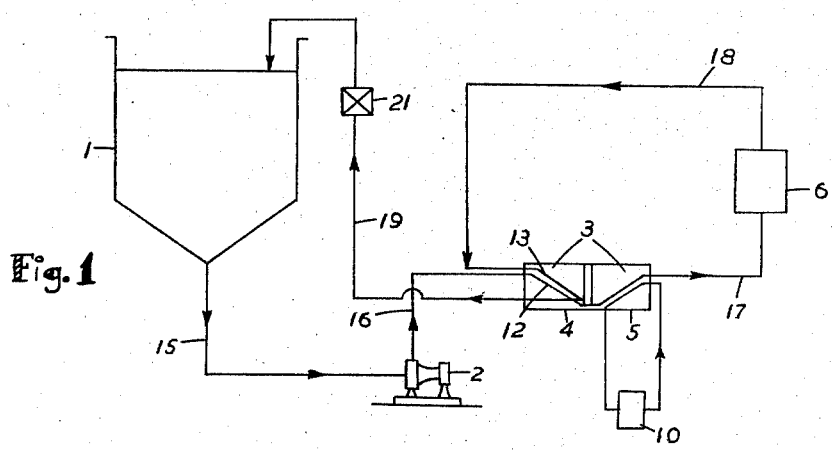
Figure 1 is a diagram of an apparatus made in accordance with the invention.

The arrangement shown in Figure 1 has the lower part of the copper 1 connected by pipe 15 to the inlet of the pump 2, the outlet of which is connected by pipe 16 to the low temperature side 12 of the regenerator. This low temperature side 12 is connected directly to the heating apparatus 5.

The wort outlet of the heating apparatus 5 is connected by a pipe 17 to the holding section 6 and the outlet from the section 6 is connected by a pipe 18 to the inlet of the high temperature side 13 of the regenerator. The outlet from the side 13 is connected by a pipe 19 back to the top of the copper 1.

A throttle 21 provides for control of the pressure of the returning wort.

In a particular process described by way of example the wort is held at boiling temperature at atmospheric pressure in the copper and leaving this copper through the pipe 15 is forced by the pump 2 through the sinuous passages constituting the low temperature side of the regenerator. The wort is heated in the regenerator to say 240° F. and then enters the heating apparatus 5 in which the wort is heated to say 250° F. The wort is held at this temperature in the section 6 and is then passed back through the other sinuous passage constituting the high temperature side 13 of the regenerator, thereby giving up some of its heat so that its temperature is reduced to only slightly above boiling point at atmospheric pressure. The wort is then discharged into the upper part of the heater to effect evaporation.

Figure 2:
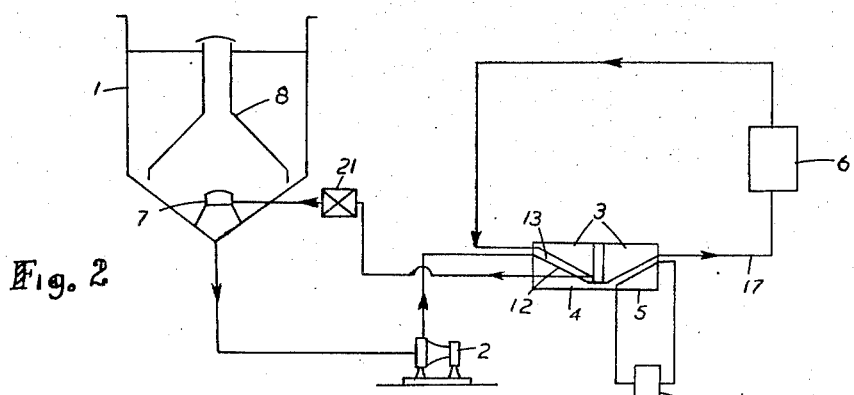
Figure 2 is a similar diagram showing a modification.

In the modification shown in Figure 2 the copper contains a flashing chamber 7 and a fountain device 8 and the pipe 19 instead of being connected to the top of the copper is connected to the bottom of the copper and introduces the wort into the flashing chamber 7 to effect evaporation and agitation of the wort which boils up through the conical fountain chamber 8 and falls back into the copper.

Figure 3:
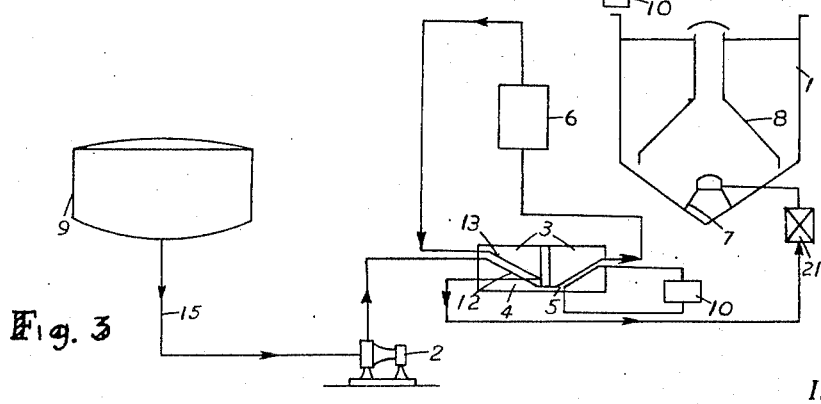
Figure 3 is a diagram of a further modified form of the apparatus.

The apparatus shown in Figure 3 provides for heating the wort on its passage between the mash tun 9 and the copper, that is to say the pipe 15 is connected to the mash tun instead of to the copper, the apparatus being otherwise the same as that shown in Figure 2. The temperature of the wort in the pipe 15 will usually be in the region of 160° F. and may be raised to say 190° F. in the regenerator and then to the required maximum temperature of say 250° F. in the heating apparatus as before. The main advantage of this arrangement is that it ensures heating every portion of the wort more certainly than with the systems of Figures 1 and 2.

We claim:

1. A method of preparing brewers' worts comprising passing wort under superatmospheric pressure through a heat regenerator zone to preheat the same, passing the preheated wort through a heating zone in indirect heat exchange relation with a heating medium to heat the wort to a temperature above its atmospheric pressure boiling point, passing the so-heated wort while under superatmospheric pressure through said regenerator zone in indirect heat exchange relation with the wort to be preheated to cool said heated wort to a temperature slightly above its atmospheric boiling point and then introducing the so-treated wort into a wort boiling zone to effect partial self evaporation and agitation of the wort in the boiling zone.

2. A method of preparing brewers' worts comprising withdrawing wort from a boiling zone, passing it under superatmospheric pressure through a heat regenerator zone to preheat the same, passing the preheated wort through a heating zone in indirect heat exchange relation with a heating medium to heat the wort to a temperature above its atmospheric pressure boiling point, passing the so-heated wort while under superatmospheric pressure through said regenerator zone in indirect heat exchange relation with the wort to be preheated to cool said heated wort to a temperature slightly above its atmospheric boiling point and then introducing the so-treated wort back into the wort boiling zone to effect partial self-evaporation and agitation of the wort in the boiling zone.

3. A method of preparing brewers' worts comprising withdrawing wort from a boiling zone, passing it under superatmospheric pressure through a heat regenerator zone to preheat the same, passing the preheated wort through a heating zone in indirect heat exchange relation with a heating medium to heat the wort to a temperature above its atmospheric pressure boiling point, passing the so-heated wort while under superatmospheric pressure through said regenerator zone in indirect heat exchange relation with the wort to be preheated to cool said heated wort to a temperature slightly above its atmospheric boiling point and then introducing the so-treated wort back into the wort boiling zone beneath the surface of wort therein to effect agitation of the wort therein and to effect partial self-evaporation.

4. An apparatus for preparing brewers' worts comprising a boiler, a regenerator having a low temperature passage and a high temperature passage in indirect heat exchange relation, an indirect heat exchange heater, means connecting the low temperature passage serially with the heater and the high temperature passage, a conduit connecting the high temperature passage with the boiler at a region below the wort level of the boiler, a throttle valve in said conduit, and a pump having an intake connected to the boiler and a discharge connected to the low temperature passage of the regenerator for withdrawing wort from the boiler and passing it under pressure serially through the low temperature passage of the regenerator through the heater, through the high temperature passage of the regenerator, through the throttle valve to reduce its pressure and then into the boiler.

5. An apparatus for preparing brewers' worts comprising a boiler, a regenerator having a low temperature passage and a high temperature passage in indirect heat exchange relation, an indirect heat exchange heater, means connecting the low temperature passage serially with the heater and the high temperature passage, a conduit connecting the high temperature passage with the lower part of the boiler, a throttle valve in said conduit, and a pump having an intake connected to the boiler and a discharge connected to the low temperature passage of the regenerator for withdrawing wort from the boiler and passing it under pressure serially through the low temperature passage of the regenerator through the heater, through the high temperature passage of the regenerator, through the throttle valve to reduce its pressure and then into the lower part of the boiler.

6. An apparatus for preparing brewers' worts comprising a mash tun, a boiler, a regenerator having a low temperature passage and a high temperature passage in indirect heat exchange relation, an indirect heat exchange heater, means connecting the low temperature passage serially with the heater and the high temperature passage, a conduit connecting the high temperature passage with the lower part of the boiler, a throttle valve in said conduit, and a pump having an intake connected to the mash tun and a discharge connected to the low temperature passage of the regenerator for withdrawing wort from the boiler and passing it under pressure serially through the low temperature passage of the regenerator through the heater, through the high temperature passage of the regenerator, through the throttle valve to reduce its pressure and then into the boiler.

RICHARD SELIGMAN.
STANLEY WILLIAM THOMAS PAINE.

REFERENCES CITED

The following references are of record in the file of this patent:

UNITED STATES PATENTS

| Number | Name | Date |
|---|---|---|
| 449,503 | Valentin | Mar. 31, 1891 |
| 1,046,577 | Fisher | Dec. 10, 1912 |
| 1,367,517 | Hostettler | Feb. 1, 1921 |